United States Patent [19]

Sakurai et al.

[11] 4,159,963
[45] Jul. 3, 1979

[54] CATALYST FOR PRODUCING POLYOLEFINS

[75] Inventors: Hisaya Sakurai; Hideo Morita; Tadashi Ikegami; Masayoshi Miya, all of Kurashikishi, Japan

[73] Assignee: Asahi Kasei Kogyo Kabushiki Kaisha, Osaka, Japan

[21] Appl. No.: 873,630

[22] Filed: Jan. 30, 1978

[30] Foreign Application Priority Data

Feb. 16, 1977 [JP] Japan .................................. 52-14940

[51] Int. Cl.² .............................................. C08F 4/64
[52] U.S. Cl. ............................ 252/429 B; 252/431 C; 526/124; 526/125; 526/127; 526/128
[58] Field of Search ........... 252/429 B, 429 C, 431 R, 252/431 C, 431 N

[56] References Cited

U.S. PATENT DOCUMENTS

| | | | |
|---|---|---|---|
| 3,670,043 | 6/1972 | Kubicek et al. ............. | 252/429 B X |
| 3,676,418 | 7/1972 | Tashiro et al. ................ | 252/429 B X |
| 3,784,481 | 1/1974 | Lassau et al. ................. | 252/429 B X |
| 3,823,196 | 7/1974 | Morikawa et al. ........... | 252/429 B X |
| 4,004,071 | 1/1977 | Aishima et al. .............. | 252/429 C X |
| 4,027,089 | 5/1977 | Aishima et al. .............. | 252/429 B X |

*Primary Examiner*—Patrick Garvin
*Attorney, Agent, or Firm*—Sprung, Felfe, Horn, Lynch & Kramer

[57] ABSTRACT

Novel highly active catalysts useful for highly stereospecific polymerization of olefin which enables to produce polymer of good grain size having a high stereoregularity can be obtained by a combination of [A] a solid catalyst component obtained by reacting a specified organomagnesium component (i) with a specified chlorosilane compound containing Si—H (ii) to obtain a solid (1) and reacting said solid (1) with a titanium compound containing at least one halogen atom (2) and a carboxylic acid or a derivative thereof (3) and [B] a component consisting of an organometallic compound and a carboxylic acid or a derivative thereof.

The organomagnesium component is of the formula

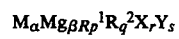

wherein $\alpha$ is a number of 0 or greater than 0; $\beta > 0$; p, q, r and s are each a number of 0 or greater; $p+q+r+s = m\alpha + 2\beta$ wherein m is the valency of M; M is a metal element of the 1st to the 3rd group of the Periodical Table; $R^1$ and $R^2$ are the same or different hydrocarbon radicals having 1 to 20 carbon atoms; X and Y are the same or different radicals selected from the group consisting of halogen, $OR_3$, $OSiR^4R^5R^6$, $NR^7R^8$ and $SR^9$ wherein $R^3$, $R^4$, $R^5$, $R^6$, $R^7$ and $R^8$ are each hydrogen atom or a hydrocarbon radical having 1 to 20 carbon atoms and $R^9$ is a hydrocarbon radical having 1 to 20 carbon atoms, and chlorosilane is of the formula

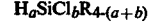

wherein a and b are each a number greater than 0, having the relationship $a \leq 2$ and $a+b \leq 4$ wherein R is a hydrocarbon radical having 1 to 20 carbon atoms.

15 Claims, No Drawings

CATALYST FOR PRODUCING POLYOLEFINS

DETAILED DESCRIPTION OF THE INVENTION

The present invention relates to novel highly active catalysts for highly stereospecific polymerization of olefins into polymers of good grain size and a high stereoregularity and methods of polymerizing olefins in which said catalysts are used. Particularly, the present invention is suitable for polymerizing stereospecifically propylene, butene-1, pentene-1, 4 methyl-pentene-1, 3-methyl-butene-1 and the like olefins. The present invention is suitable also for copolymerizing said olefins with ethylene or other olefins.

It has been well known that stereospecific polymers are obtained by contacting olefins with Ziegler-Natta catalyst system comprising a transition metal compound of a metal of the 4th to 6th A group of the Periodic Table and an organometallic compound of a metal of the 1st to 3rd group of the Periodic Table. Particularly, a combination of a titanium halide and an organo-aluminum compound such as triethylaluminum or diethylaluminum chloride is widely used in commercial production as catalysts for stereospecific polymerization of olefins.

Although polymerization of olefins such as propylene carried out with this type of catalyst results in a relatively high yield of boiling heptane insoluble polymers, i.e. stereospecific polymers, polymerization activity of the catalyst is not fully satisfactory and removal of catalyst residue from resultant polymer is required.

Recently, as highly active catalysts for polymerization of olefins, many catalyst systems have been proposed which comprise an inorganic or organo- magnesium compound and a titanium compound, or above-mentioned two components and an electron-donor. For example such inventions have been known as those using magnesium halide (Japanese Laid Open Patent Application (hereinafter abbreviated as JLOPA) No. 47-9342 [corresponding to British patent (hereinafter abbreviated as BP) 1335887], 48-16986 [BP 1387888], 48-16987 [BP 1387889], 48-16988 [BP 1387890], and the like), those using a Mg(OH)Cl (Japanese patent publication No. 13050 of 1968), [CP739550] those using an alkylmagnesium (Japanese patent publication No. 51-11672) (BP 1373981), those using a Grignard compound (JLOPA No. 48-83193 BP 139001). Although these systems form their own catalytic systems according to the kind of magnesium compound, they are hardly used per se as catalysts for industrial stereoregular polymerization of olefins having both sufficient polymerization activity and stereoregularity because some of them show notable activity for propylene polymerization but with too much production of amorphous polymer or other of them show high stereoregularity but with insufficiency in polymerization activity. Particularly, they are insufficient in polymer yield per solid catalyst component and produce polymers having a large content of halogen which brings about the corrosion of equipments of production process and molding machine, and physical properties of obtained product are also poor.

We have endeavoured to improve these points and, as a result, found a new catalyst in which a solid obtained by reacting an organomagnesium component, preferably a solution containing an inert-hydrocarbon-soluble organomagnesium component with a Si-H bond-containing chlorosilane compound is used. This solid does not belong to any of above mentioned organo- or inorganic-magnesium compounds and is an entirely different mangesium-containing solid. Thus we have found that a solid obtained by reacting said solid with a titanium compound and a carboxylic acid or a derivative thereof have extremely superior performance as a catalyst for polymerizing olefins, and thus reached and completed the present invention.

Namely, the present invention is directed to catalysts for polymerizing olefins comprising [A] a solid catalyst component obtained by reacting components (1), (2) and (3), and [B] a component consisting of an organometallic compound and a carboxylic acid or a derivative thereof, said component (1) being a solid obtained by reacting (i) an organomagnesium component represented by the general formula $M_\alpha Mg_\beta R^1_p R^2_q X_r Y_s$ [wherein $\alpha$ is a number 0 or greater than 0; $\beta > 0$; p, q, r, s are each numbers 0 or greater than 0, respectively, having the relationship of $p+q+r+s=m\alpha+2\beta$; M is a metal element of the 1st to 3rd group of the Periodic Table; m is the valency of M; $R^1$ and $R^2$ are the same or different hydrocarbon groups having 1-20 carbon atoms, and X and Y are the same or different groups selected from the group consisting of halogen, $OR^3$, $OSiR^4R^5R^6$, $NR^7R^8$, or $SR^9$ wherein $R^3$, $R^4$, $R^5$, $R^6$, $R^7$ and $R^8$ are hydrogen atom or a hydrocarbon group having 1-10 carbon atoms and $R^9$ is a hydrocarbon group having 1-10 carbon atom] with (ii) a chlorosilane compound containing Si—H bond represented by the general formula $H_a SiCl_b R_{4-(a+b)}$ wherein a and b are numbers greater than 0, having the relationships of $a+b \leq 4$ and R is a hydrocarbon group having 1-20 carbon atoms, said component (2) being a titanium compound containing at least one halogen atom, and said component (3) being a carboxylic acid or a derivative thereof.

The first feature of the present invention is in that the catalyst efficiency per Ti component and per solid catalyst component is extremely high. For example, as evident from Example 16 hereinafter described, the catalyst efficiency of 214 g - polypropylene (PP)/g - solid catalyst·hr·propylene pressure or 8560 g - PP/g - titanium component·hr·propylene pressure was obtained in the case of propylene polymerization in hexane. In the case of propylene polymerization conducted in liquid propylene, a catalyst efficiency of 3250 g - PP/g - solid catalyst·hr or 130,000 g - PP/g - titanium component·hr or higher was readily attained.

The second feature of the present invention is in that higher stereoregularity is achieved in addition to the above-mentioned high activity. Incidentially, the value of boiling heptane insoluble portion is as high as 95.8%.

The third feature of the present invention is in that the obtained polymer is of good grain size and polymer powder having a high bulk density can be obtained.

Further, the fourth feature of the present invention is in that the colour of articles molded by using a polymer produced with the present catalyst is very good.

Although the essential cause of the above mentioned remarkable performance of the catalyst of the present invention is not yet certain, it is believed that a highly active halogenated magnesium solid material having a large surface area and containing the alkyl group possessing reduction power is formed as in examples hereinafter described according to the present invention. The effect of the present invention is derived from the above-mentioned specified active halogenated magnesium solid material and it is the effect which cannot be expected when compounds conventionally used such as magnesium chloride are employed, as evident also from the comparison of specific example with comparative examples.

Firstly, explanation will be given with respect to the organomagnesium component (i) represented by the general formula $M_\alpha Mg_\beta R_p^1 R_q^2 X_r Y_s$ (wherein $\alpha$, $\beta$, p, q, r, s, M, $R^1$, $R^2$, X, Y have the same meanings as described above). $R^1$ and $R^2$ are hydrocarbon group having 1-20 carbon atoms, $R^3$-$R^8$ are hydrogen atom or hydrocarbon group having 1-10 carbon atoms and $R^9$ is a hydrocarbon group having 1-10 carbon atoms.

This component (i) is shown in the form of a complex compound of an organomagnesium but includes so-called Grignard compound RMgX, $R_2$Mg and all of the complexes of these compounds with other metallic compounds. The above-mentioned hydrocarbon groups, include alkyl, cycloalkyl and aryl group, for example, methyl, ethyl, propyl, butyl, amyl, hexyl, octyl, decyl, dodecyl, cyclohexyl, phenyl group, and the like. It is preferable that $R^1$ is particularly an alkyl group. It does not matter even if $R^3$-$R^8$ are hydrogen atoms. As halogen, fluorine, chlorine, bromine and iodine are used but chlorine is particularly preferable.

As metal atom M, any metal element of the first to the third group of the Periodical Table can be used. For example, sodium, potassium, lithium, calcium, beryllium, zinc, barium, boron, aluminum and the like can be mentioned.

Further there are relationships that $\beta/\alpha$ is equal to or greater than 0.1, preferably equal to or greater than 0.5 and $(r+s)/(\alpha+\beta)$ is in the range of 0-2.0.

As catalyst components to be used in the present invention, organomagnesium complexes or compounds soluble in an inert hydrocarbon medium are preferable. As such organomagnesium complexes, those complexes in which M is either of aluminum, zinc, boron or beryllium, the ratio of magnesium to metal atom M, $\beta/\alpha$ is equal to or greater than 0.5, particularly 1-10, the ratio of the sum of the groups X+Y to the sum of metal atom, $(r+s)/(\alpha+\beta)$ is 0 or greater than 0 to 1.0 or less, preferably 0-0.8 (inclusive) and X and Y are groups other than halogen such groups as $OR^3$, $OSiR^4R^5R^6$, $NR^7R^8$, $SR^9$ in the above-mentioned general formula are used.

As organomagnesium compounds, those dialkylmagnesium compounds of the above-mentioned general formula, in which $\alpha=0$, $r+s=0$, $R^1$ and $R^2$ are alkyl groups, and alkoxy and siloxymagnesium compounds in which $\alpha=0$, $(r+s)/\beta=1$, and X and Y are $OR^3$ or $OSiR^4R^5R^6$ are used.

As such compounds, (sec.-$C_4H_9$)$_2$Mg, (tert.-$C_4H_9$)$_2$Mg, n-$C_4H_9MgC_2H_5$, n-$C_4H_9$Mg sec.-$C_4H_9$, n-$C_4H_9$Mg-tert.-$C_4H_9$, n-$C_6H_{13}MgC_2H_5$, n-$C_8H_{17}MgC_2H_5$, (n-$C_6H_{13}$)$_2$Mg, (n-$C_8H_{17}$)$_2$Mg, (n-$C_{10}H_{21}$)$_2$Mg, n-$C_4H_9$Mg($OC_3H_7$), n-$C_4H_9$Mg($OC_4H_9$), n-$C_4H_9$Mg($OC_5H_{11}$), n-$C_4H_9$Mg($OC_6H_{13}$), n-$C_4H_9$Mg($OC_8H_{17}$), $C_5H_{11}$Mg($OC_4H_9$), $C_6H_{13}$Mg($OC_3H_7$), n-$C_4H_9$Mg($OSiH\cdot CH_3\cdot C_4H_9$), n-$C_4H_9$Mg($OSi\cdot H\cdot C_6H_5\cdot C_4H_9$) and the like are mentioned.

As compounds of this kind, a complex compound of alkylmagnesium halide or dialkylmagnesium with a Lewis base such as ether, ketone, amine or the like or a solution of these compounds in ether is also useful.

Among the above-mentioned organomagnesium component, those which are particularly preferable are the complex represented by the general formula described above and consisting of compounds of two metals of M and Mg which are soluble in an inert hydrocarbon.

These organomagnesium compounds or organomagnesium complexes are synthesized by reacting an organomagnesium compound represented by the general formula, $R^1$MgQ or $R_2^1$Mg (wherein $R^1$ has the same meaning as above-mentioned and Q is halogen) with an organometallic compound represented by the general formula $MR_m^2$ or $MR_{m-1}^2$H wherein M, $R^2$ and m have the same meaning as above-mentioned, in an inert hydrocarbon medium such as hexane, heptane, cyclohexane, benzene, toluene and the like at a temperature in the range from room temperature to 150° C. and if necessary further reacting the resulting reaction product with an alcohol, water, siloxane, amine, imine, mercaptan or a dithiocompound.

Further the organomagnesium compound or organomagnesium complex can be synthesized by reacting $MgX_2$, $R^1MgX$ with $MR_m^2$, $MR_{m-1}^2$H or by reacting $R^1MgX$, $MgR_2^1$ with $R_n^2MX_{m-n}$ or by reacting $R^1MgX$, $MgR_2$ with $Y_nMX_{m-n}$ wherein M, $R^1$, $R^2$, X, Y have the above-mentioned meanings and include the case where X and Y are halogen, and n is a number of 0 to m.

The description will be given with regard to chlorosilane compounds (ii) containing Si—H bond, represented by the general formula $H_aSiCl_bR_{4-(a+b)}$ wherein a, b and R have the same meaning as above-mentioned.

The hydrocarbon groups represented by R in the above-mentioned formula, include alkyl, cycloalkyl, aryl, for example, methyl, ethyl, propyl, butyl, amyl, hexyl, decyl, cyclohexyl, phenyl groups and the like. Preferably the hydrocarbon group is alkyl containing 1-10 carbon atoms and a lower alkyl group such as methyl, ethyl, propyl or the like is particularly preferable. The range of the value of a and b is defined by a,b>0, $a+b\leq4$, and $0<a\leq2$.

As such compounds, $HSiCl_3$, $CH_3SiHCl_2$, $C_2H_5SiHCl_2$, n-$C_3H_7SiHCl_2$, i-$C_3H_7SiHCl_2$, n-$C_4H_9SiHCl_2$, i-$C_4H_9SiHCl_2$, $C_6H_5SiHCl_2$, 4-$ClC_6H_4SiHCl_2$, $CH_2$=$CHSiHCl_2$, $C_6H_5CH_2SiHCl_2$, 1-$C_{10}H_7SiHCl_2$, $CH_2$=$CHCH_2SiHCl_2$, $CH_3SiH_2Cl$, $C_2H_5SiH_2Cl$, $(CH_3)_2SiHCl$, $(CH_3)$ (i-$C_4H_9$)SiHCl, $(CH_3)$ $(C_6H_5)$SiHCl, $(C_2H_5)_2SiHCl$, $(C_6H_5)_2SiHCl$ alone or a mixture of these compounds or a mixture partially containing any of these compounds are preferable. As particularly preferable chlorosilane compounds, trichlorosilane, monomethyldichlorosilane, dimethylchlorosilane, ethyldichlorosilane, etc. can be mentioned.

The description will be given with regard to the reaction between an organomagnesium compound (i) and a chlorosilane compound (ii). The reaction between an organomagnesium compound or organomagnesium complex and a chlorosilane compound can be carried out in an inert reaction medium e.g. an aliphatic hydrocarbon such as hexane, heptane, an aromatic hydrocarbon such as benzene, toluene, xylene, an alicyclic hydrocarbon such as cyclohexane, methylcyclohexane or an ether type medium such as ether, tetrahydrofuran and the like or a mixture of these compounds.

From the point of catalyst performance, an aliphatic hydrocarbon medium is preferable.

With regard to the reaction temperature, there is no particular limitation but from the point of the reasonable rate of reaction, the reaction is preferably carried out at a temperature of 40° C. or higher. With regard to the reaction ratio, there is no particular limitation but it is recommended to use preferably the range of 0.01 mol to 100 mol chlorosilane component and most preferably 0.1 mol to 10 mol relative to one mol of the organomagnesium component.

With regard to the reaction method, either of a simultaneous addition method in which 2 kinds of the catalyst components are at the same time introduced into a reaction zone (method a) or a method in which a chlorosilane component is charged in the reaction zone in advance and thereafter an organomagnesium complex component is introduced in the reaction zone (method b) or a method in which an organomagnesium complex component is charged in the reaction zone in advance, and chlorosilane component is added (method c), is possible but particularly method (b) gives preferable result. When an organomagnesium compound is insoluble, it is possible also to use a chlorosilane compound as a reaction reagent in the reaction medium in the form of heterogeneous treatment reaction. Also in such an occasion, the above-mentioned conditions of temperature and reaction mol ratio are preferable.

The composition and the structure of the solid material obtained according to the above-mentioned reaction, may vary according to the kinds of starting raw materials, and reaction condition, but from the analytical value of composition it is inferred that the solid material is a halogenated magnesium solid material having about 0.1-2.5 millimol of alkyl group having Mg—C bond per g solid material. This solid material has an extremely large specific surface area showing a value as high as 100-300 m$^2$/g according to the measurement by B.E.T. method. The solid material of the present invention, has an extremely higher surface area compared with the conventional magnesium halide solid and it is a large characteristic feature that said solid material is an active magnesium solid material containing alkyl group possessing reduction power.

Then description will be made with regard to the titanium compound (2) containing at least one halogen atom.

As a halide of and an alkoxyhalogenide of tetravalent titanium compound, titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, etc. are used solely or in the form of mixture. Preferable compounds are those containing 3 or more halogen atom, particularly preferable is titanium tetrachloride.

Description will be given with regard to the carboxylic acid and its derivatives (3).

The carboxylic acid and its derivatives include aliphatic, alicyclic and aromatic, saturated and unsaturated mono and polycarboxylic acids, their acyl halides, their acid anhydrides, and their esters containing up to 30 carbon atoms.

As the carboxylic acid, for example, formic acid, acetic acid, propionic acid, butyric acid, valeric acid, oxalic acid, malonic acid, succinic acid, maleic acid, acrylic acid, benzoic acid, toluic acid, terephthalic acid, etc. can be mentioned. Among them, benzoic acid and toluic acid are preferable.

As the carboxylic halide, for example, acetyl chloride, propionyl chloride, n-butyryl chloride, isobutyryl chloride, succinoyl chloride, benzoyl chloride, tolyl chloride, etc. can be mentioned. Among them, aromatic carboxylic acid halide such as benzoyl chloride, tolyl chloride are particularly preferable.

As carboxylic anhydride, for example, acetic anhydride, propionic anhydride, n-butyric anhydride, succinic anhydride, maleic anhydride, benzoic anhydride, toluic anhydride, anisic anhydride, phthalic anhydride, etc. can be mentioned. Among them, benzoic anhydride, toluic anhydride and anisic anhydride are particularly preferable.

As carboxylic acid ester, for example, ethyl formate, methyl acetate, ethyl acetate, n-propyl acetate, ethyl propionate, ethyl n-butyrate, ethyl valerate, ethyl capronate, ethyl heptanoate, di-n-butyl oxalate, monoethyl succinate, diethyl succinate, ethyl malonate, di-n-butyl malate, methyl acrylate, ethyl acrylate, methyl methacrylate, methyl benzoate, ethyl benzoate, n- and isopropyl benzoate, n-, i-, sec.- and tert. butyl benzoate, methyl p-toluate, ethyl p-toluate, i-propyl p-toluate, n- and i-amyl toluate, ethyl o-toluate, ethyl m-toluate, methyl p-ethylbenzoate, ethyl p-ethylbenzoate, methyl anisate, ethyl anisate, i-propyl anisate, methyl p-ethoxybenzoate, ethyl p-ethoxybenzoate, methyl terephthalate, etc. can be mentioned. Among them, esters of aromatic carboxylic acid are preferable, and methyl benzoate, ethyl benzoate, methyl p-toluate, ethyl p-toluate, methyl anisate, ethyl anisate are particularly preferable.

Description will be given with regard to the synthesis method of solid catalyst component obtained by reacting the above-mentioned solid material (1), titanium compound (2), carboxylic acid or its derivative (3).

For the reaction of the above mentioned solid material (1) obtained by the reaction of an organomagnesium component and a chlorosilane compound, the titanium compound (2) and the carboxylic acid or a derivative thereof (3), any of the methods can be adopted such as [1] a process of simultaneous reaction of the solid material, titanium compound and carboxylic acid or a derivative thereof (method 1), a process of firstly reacting the solid material and a titanium compound followed by the reaction with a carboxylic acid or a derivative thereof (method 2), and a process of firstly reacting the solid material and the carboxylic acid or a derivative thereof followed by the reaction with a titanium compound (method 3). Although either of these methods may be employed, latter two methods, especially method 3, are preferable.

Next, the operation of reacting the above-mentioned solid material, titanium compound, and a carboxylic acid or carboxylic acid derivative will be explained.

(i) Firstly explanation will be made with regard to the reaction between a solid material obtained by reacting an organomagnesium component and a chlorosilane compound or a reaction product of this solid material and a carboxylic acid or a derivative thereof and a titanium compound.

The reaction may be carried out using an inert reaction medium or using an undiluted titanium compound per se as a reaction medium without using an inert reaction medium. As an inert reaction medium, for example, there may be mentioned aliphatic hydrocarbons such as hexane and heptane, aromatic hydrocarbons such as benzene, toluene, and xylene, alicyclic hydrocarbons such as cyclohexane and methylcyclohexane, and the like, among which aliphatic hydrocarbons are preferred. The reaction temperature and the concentration of the titanium compound, though not specifically limited, are preferably in the range of 80° C. or higher and 1 mol/l or higher of a titanium compound concentration, respectively. Still more preferably, undiluted titanium compound per se is used for carrying out reaction as a reaction medium. With regard to a reaction mol ratio, a sufficiently excessive amount of a titanium compound relative to the magnesium component in the solid material gives preferable results.

(ii) Secondly, explanation will be given about the reaction between a solid material obtained by reacting an organomagnesium component and a chlorosilane compound or a reaction product of this solid material with a titanium compound and a carboxylic acid or a derivative thereof.

The reaction is carried out using an inert reaction medium. As the inert reaction medium, any of the above mentioned aliphatic, aromatic or alicyclic hydrocarbons may be used. The reaction temperature, though not specifically limited, preferably ranges from room temperature to 100° C. In case a solid material and a carboxylic acid or a derivative thereof are reacted, the ratio of the two components of the reaction is not specifically limited. However, it is recommended that the amount of carboxylic acid or a derivative thereof ranges between 0.001 mol–50 mols, preferably 0.005 mol–10 mols relative to one mol of alkyl group contained in the organomagnesium solid component. In case the reaction product of the solid material and a titanium compound is reacted with a carboxylic acid or a derivative thereof, the ratio of the two components of the reaction ranging 0.01 mol–100 mols, preferably 0.1 mol–10 mols of the amount of carboxylic acid or a derivative thereof relative to one mol of titanium atom in the organomagnesium solid component is recommended.

Although the composition and the structure of the solid catalyst obtained according to the above mentioned reactions (i) to (ii) vary depending on starting material and reaction condition, it was found from the analysis of composition that the solid catalyst contains approximately 1–10 percent by weight of titanium and has a surface area of 100–300 m²/g.

Organometallic compounds used as component of [B] are compounds of metals of I–III group in the Periodic Table and especially an organoaluminum complexes containing an organoaluminum and an organomagnesium are preferred. As organoaluminum compounds, those represented by the general formula $AlR_t^{10}Z_{3-t}$ (wherein $R^{10}$ is a hydrocarbon group having 1–20 carbon atoms, Z is a member selected from hydrogen, halogen, alkoxy, aryloxy and siloxy, and t is a number of 2–3) are used solely or as a mixture. In the above formula, the hydrocarbon group having 1–20 carbon atoms which is represented by $R^{10}$ includes aliphatic hydrocarbons, aromatic hydrocarbons and alicyclic hydrocarbons.

Specifically, compounds, for example, triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum, diethylaluminum hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydroxaluminum dimethyl, ethylmethylhydroxyaluminum diethyl, ethyldimethylsiloxyaluminum diethyl, aluminum isoprenyl and the like, and mixtures thereof are recommended.

A combination of these alkylaluminum compounds with the above mentioned solid catalyst provides highly active catalyst, and especially trialkylaluminum and dialkylaluminum hydride are preferable because it enables to attain the highest activity.

The complexes which contain an organomagnesium are those hydrocarbon soluble organomagnesium complexes represented by the above-mentioned general formula $M_\alpha Mg_\beta R_p^1 R_q^2 X_r Y_s$ (wherein $\alpha$ and $\beta$ are a number greater than 0 with the proviso that $\beta/\alpha$ is 0.1–10, p, q, r and s are each 0 or a number greater than 0, having the relationship of $p+q+r+s=m\alpha+2\beta$ and $0 \leq (r+s)/(\alpha+\beta) < 1$, M is aluminum, zinc, boron or beryllium atom; m is the valency of M, $R^1$ and $R^2$ are the same or different hydrocarbon groups having 1–10 carbon atoms, X and Y are the same or different groups indicating $OR^3$, $OSiR^4R^5R^6$, $NR^7R^8$ or $SR^9$ wherein $R^3$, $R^4$, $R^5$, $R^6$, $R^7$ and $R^8$ are hydrogen or a hydrocarbon group having 1–10 carbon atoms, $R^9$ is a hydrocarbon groups having 1 to 10 carbon atoms, and especially complexes wherein M is aluminum are preferred.

The carboxylic acid or a derivative thereof to be added to an organometallic compound may be the same with or different from the carboxylic acid or a derivative thereof used for the preparation of the solid catalyst component. As to the manner of addition, the two components may be mixed prior to the polymerization or they may be added to the polymerization system, separately. Especially preferred is to add separately the product obtained by previously reacting a part of an organometallic compound with a carboxylic acid or a derivative thereof and the remaining organometallic compound to the polymerization system.

The ratio of the two components to be combined ranges in the carboxylic acid amount 0.01 mol–10 mol, preferably 0.05 mol–1 mol relative to a mol of the organometallic compound.

The high stereoregularity of the polymer which is one of the effectiveness of the present invention can be attained only in case where a carboxylic acid or its derivative is added to both of the solid catalyst component [A] and the organometallic component [B]. It is not possible to obtain the polymer of extremely high stereoregularity of the present invention when a carboxylic acid or its derivative is added only to [A] or [B] component.

The catalyst of the present invention comprising the solid catalyst component and the component of an organometallic compound incorporated with a carboxylic acid or a derivative thereof may be added to the polymerization system under the polymerization condition or it may be blended prior to the polymerization.

The ratio of the component of an organometallic compound which is incorporated with a carboxylic acid or a derivative thereof relative to 1 gram of the solid catalyst component preferably ranges 1 milli mol–3000 milli mol.

The present invention relates to highly active catalysts for highly stereospecific polymerization of olefins. Especially the present invention is suitable for polymerizing stereo-regularly propylene, butene-1, pentene-1, 4-methylpentene-1, 3-methylbutene-1 and the like olefins singly. Also it is suitable for copolymerizing said olefins with ethylene or other olefins. Further it is suitable for polymerizing ethylene with a better efficiency. It is also possible in the present invention to add hydrogen, a halogenated hydrocarbon or an organometallic compound which is liable to cause chain transfer in order to regulate molecular weight of polymer.

As to the manner of polymerization, a usual suspension polymerization, a bulk polymerization in liquid monomers, or a gas phase polymerization can be employed. Suspension polymerization may be carried out at room temperature—150° C. by introducing the catalyst together with a polymerization solvent e.g. an aliphatic hydrocarbon such as hexane or heptane, an aromatic hydrocarbon such as benzene, toluene or xylene, or an alicyclic hydrocarbon such as cyclohexane or methylcyclohexane, and introducing an olefin such as propylene under a pressure of 1–20 Kg/cm² under inert atmosphere. Bulk polymerization of olefins may be carried out under the condition of an olefin such as propylene, etc. being in the liquid state using a catalyst and the liquid olefin as a polymerization solvent. For example, propylene can be polymerized in propylene itself under a pressure of 10–45 Kg/cm² at a temperature of from room temperature to 90° C. On the other hand, gas phase polymerization can be carried out under the condition of an olefin such as propylene being in gas state, e.g. under a pressure of 1–50 Kg/cm² and at a temperature ranging from room temperature to 120° C. in the absence of a solvent, by means of a fluidized bed, a movable bed or mechanical stirrer so that the olefin such as propylene and the catalyst can be well contacted.

Hereinafter the present invention will be explained by examples. In examples, insoluble polymer of n-heptane extraction means remaining portion formed after six hour extraction of polymer with boiling n-heptane, and inherent viscosity was measured in tetralin at 135° C.

Catalyst efficiencies (or polymerization yield) are expressed by the amount (g) of polymer formed per 1 g of transition metal, one hour, 1 Kg/cm² of olefin pressure.

EXAMPLE 1

(I) Synthesis of hydrocarbon soluble organomagnesium complex

Di-n-butyl magnesium (13.80 g) and triethylaluminum (1.90 g) were charged into a 200 ml volume flask having been purged with nitrogen, together with heptane (100 ml) and reacted at 80° C. for two hours to obtain a solution of an organomagnesium complex. Analysis showed that the complex had a composition of $AlMg_{6.0}(C_2H_5)_{2.9}(n-C_4H_9)_{12.1}$ and the concentration of the organometal was 1.16 mol/l.

(II) Preparation of a solid material by the reaction with a chlorosilane compound.

Oxygen and moisture in a 200 ml volume flask fitted with a dropping funnel and a water cooled reflux condenser were purged with nitrogen, and under nitrogen atmosphere, 50 mmol of trichlorosilane ($HSiCl_3$) in heptane (1 mol/l) was charged in the flask and heated to 50° C. Next, 50 ml of the solution of said organomagnesium complex was measured and taken up into the dropping funnel, added thereto dropwise with stirring over one hour at 50° C., and further reacted therewith at this temperature for one hour. Resultant hydrocarbon insoluble white precipitate was isolated, washed with hexane, and dried to obtain 4.2 g of a white solid material. Analysis of this solid material showed that 1 g of this solid contained 9.20 mmol of Mg, 19.20 mmol of Cl, 1.70 mmol of Si and 0.94 mmol of alkyl group, and specific surface area measured by B.E.T. method was 270 m²/g.

(III) Preparation of solid catalyst component.

To a pressure proof vessel having been purged with nitrogen was charged 2.0 g of the above mentioned solid and 30 ml of titanium tetrachloride. After reaction was conducted with stirring at 130° C. for two hours, solid portion was isolated by filtration, washed thoroughly with hexane, and dried, and a pale pink solid was obtained.

The solid (1.9 g) was taken up in a 200-ml flask having been purged with nitrogen, which was fitted with a water-cooled reflux condenser. Sixty ml of hexane was added, followed by addition of 1.5 mmol of ethyl benzoate in hexane (0.5 mol/l). The mixture was heated to reflux, and the reaction proceeded with stirring for one hour. After the reaction mixture was left to cool to room temperature, the solid portion was filtered, washed fully with hexane, and dried to obtain a solid catalyst component of a light purple color. Analysis of the solid catalyst component showed that it contained 2.1 wt.% of titanium. The specific surface area measured by the B.E.T. method was 215 m²/g.

(IV) Polymerization of propylene in a solvent

The solid catalyst component (200 mg) synthesized in (III), above, 3.2 mmol of triethylaluminum and 1.2 mmol of ethyl benzoate were charged, together with 0.8 liter of dehydrated deaerated hexane, into a 1.5-liter autoclave, the inside of which had been purged with nitrogen and evacuated to vacuum. Propylene was pressurized up to a pressure of 5.0 Kg/cm² so as to keep the total pressure at 4.8 Kg/cm², while maintaining the temperature inside the autoclave at 60° C. Polymerization is allowed to proceed for 2 hours, while maintaining the above gauge pressure. There were obtained 115 g of a hexane-insoluble polymer and 4.0 g of a hexane-soluble portion. The catalyst efficiency was 2740 g of polymer/g of titanium-hour propylene pressure. The hexane-insoluble polymer was extracted with boiling n-heptane, whereby the remaining portion was 95.6%. The hexane-insoluble polymer had an inherent viscosity of 5.8 dl/g as measured in tetralin at 135° C. The characteristics of particles were excellent, showing a bulk density of 0.327 g/cm³ and a proportion of 35–150 mesh powder was 92%.

EXAMPLE 2

Slurry polymerization of propylene was carried out in the same manner as in Example 1, using the mixture having been synthesized from 1.6 mmol of triethylaluminum in hexane (1 mol/l) and 0.8 mmol of ethyl benzoate in hexane (1 mol/l) and 1.6 mmol of triethylaluminum and 200 mg of the solid catalyst prepared in Example 1. There were obtained 152 g of a hexane-insoluble polymer and 5.5 g of a hexane-soluble portion. The catalyst efficiency was 3,620 g of PP/g of Ti component-hour-propylene pressure. After the hexane-insoluble polymer was extracted with n-heptane, the remaining portion was 94.3%.

EXAMPLE 3

Liquid propylene (350 g) was charged into a 1.5-liter autoclave, the inside of which had been purged with nitrogen and evacuated to vacuum. The inside temperature was elevated up to 60° C. The solid catalyst (50 mg) synthesized in example 1, 2.8 mmol of triethylaluminum and 1.0 mmol of ethyl benzoate were then added to the autoclave. While maintaining the inside temperature at 60° C., the polymerization was allowed to proceed for 2 hours, to obtain 101 g of a polymer. The catalyst efficiency was 1,010 g of PP/g of solid catalyst-hour or 48,100 g of PP/g of Ti component-hour. After the polymer was extracted with n-heptane, the remaining portion was 92.5%.

EXAMPLE 4

A solid material (1.9 g) synthesized by reacting an organomagnesium complex of example 1, (II) with trichlorosilane ($HSiCl_3$) was placed in a 200-ml flask having been purged sufficiently with nitrogen and fitted with a water-cooled reflux condenser. Thereto were added 60 ml of hexane and 6 ml (40 mmol) of ethyl benzoate. The mixture was heated to reflux, and the reaction was allowed to proceed with stirring for one hour. The solid portion was filtered off, washed fully with hexane, and dried. The solid was then taken up in an autoclave having been purged with nitrogen, and 40 ml of a solution of 4.0 mol of titanium tetrachloride in one liter of heptane was charged therein. The mixture was reacted with stirring at 130° C. for 2 hours. The solid portion was filtered off, washed fully with hexane and dried to obtain a light yellowish white solid catalyst component. Analysis of this catalyst showed that it contained 2.2 wt.% titanium. The specific surface area measured by the B.E.T. method was 207 $m^2/g$.

Using this solid catalyst component (200 mg), 3.2 mmol of triethylaluminum and 1.2 mmol of ethyl benzoate, polymerization was allowed to proceed in the hexane solvent at 60° C. and a total gauge pressure of 4.8 $Kg/cm^2$ for 2 hours in the same manner as in part (IV), Example 1. There were obtained 122 g of a hexane-insoluble polymer and 4.3 g of a hexane-soluble portion. After the hexane-insoluble polymer was extracted with n-heptane, the remaining portion was 95.3%. Polymerization yield was 2,740 g of polymer/g of Ti hour-propylene pressure. The hexane-insoluble polymer had an inherent viscosity of 5.4 dl/g and a bulk density of 0.334 $g/cm^3$.

EXAMPLE 5

A solution of the organomagnesium complex synthesized by the method same with that of Example 1, (1) (300 mmol) was introduced into a 500 ml two-necked flask equipped with a 100 ml dropping funnel. A heptane solution of monomethyldichlorosilane ($HSiCl_2CH_3$) (2 mol/l) (150 mmol) was introduced in the dropping funnel. While maintaining the flask at 50° C., dichloromethylsilane was dropped over one hour. After completion of the dropping, the stirring was continued at 50° C. for one hour. Resultant white solid material was filtered, washed sufficiently with hexane and dried. The solid material (4.0 g) was reacted with titanium tetrachloride and ethyl benzoate by the process same with that of Example 1, (iii). The result of analysis of this solid catalyst showed that 2.3% by weight of titanium was contained and the specific surface area was 220 $m^2/g$ as measured by the B.E.T. method.

This solid catalyst component (200 mg), triethylaluminum (3.2 mmol) and benzoic acid (1.2 mmol) were used to carry out polymerization as in Example 1, (IV) in a hexane solution at the inside temperature of 60° C. and under the total pressure of 4.8 $Kg/cm^2$ (gauge pressure) whereby 142 g of hexane insoluble polymer and 8.1 g of hexane soluble portion were obtained. The remaining portion of hexane-insoluble polymer after extraction with boiling n-heptane was 90.6%. The polymerization efficiency was 3,080 g polymer/g·titanium·hr. propylene pressure. The bulk density of polymer was 0.335 $g/cm^3$.

EXAMPLES 6-15

By using organomagnesium complexes shown in Table 1 in place of $AlMg_{6.0}(C_2H_5)_{2.9}(n-C_4H_9)_{12.1}$ and a process same with those of Example 1 (II) and (III), organomagnesium complex, trichlorosilane ($HSiCl_3$), titanium tetrachloride and ethyl benzoate, a reaction was carried out to obtain a solid catalyst. By using 200 mg of the solid catalyst, 3.2 mmol of triethylaluminum, and 1.2 mmol of ethyl benzoate, a polymerization was carried out as in Example 1 (IV) under the catalyst synthesis condition to obtain the polymerization result shown in Table 1.

Table 1

| | | Synthesis of Solid Catalyst | | | |
| | | Reaction condition with $HSiCl_3$ | | | Specific |
| Examples | Organomagnesium compounds | Mol Ratio Mg/Si | Temperature (°C.) × Time (hr.) | Ti (wt. %) | surface area $m^2/g$ |
|---|---|---|---|---|---|
| 6 | $AlMg_{6.0}Et_{2.0}n-Bu_{9.5}o-Bu_{3.5}$ | 5 / 1 | 50 × 2 | 2.1 | 217 |
| 7 | $AlMg_{6.0}Et_{2.0}n-Bn_{9.5}(O-\underset{\underset{Me}{\mid}}{\overset{\overset{H}{\mid}}{Si}}-Et)_{3.5}$ | 2 / 1 | 50 × 5 | 2.6 | 228 |
| 8 | $AlMg_{4.0}Et_{2.9}(n-C_6H_{13})_{8.0}$ | 1 / 3 | 50 × 2 | 1.6 | 205 |
| 9 | $ZnMg_{2.0}Et_{2.0}n-Bu_{3.9}$ | 1 / 1 | 80 × 2 | 1.8 | 185 |
| 10 | $BeMg_{4.0}Et_{0.7}n-Pr_{6.3}[N(n-Bu)_2]_{3.9}$ | 1 / 1 | 80 × 5 | 2.9 | 195 |
| 11 | $BMG_{1.0}Et_{2.8}n-Pr_{1.5}(SEt)_{0.7}$ | 1 / 1 | 50 × 5 | 5.5 | 170 |
| 12 | n-BuMgCl (butyl ether solution) | 1 / 1 | 50 × 2 | 2.6 | 183 |
| 13 | sec-$Bu_2Mg$ | 1 / 1 | 50 × 2 | 2.7 | 198 |
| 14 | $n-C_4H_9MgC_2H_5$ | 1 / 1 | 50 × 2 | 2.4 | 182 |
| 15 | $(n-C_6H_{13})_2Mg$ | 1 / 1 | 50 × 2 | 2.5 | 160 |

| | Polymerization result | | | | |
| Examples | Polymer yield (g) | Hexane soluble portion (g) | Remaining portion after extraction with n-heptane (%) | Catalyst efficiency g-PP/g . titanium portion . hr . propylene pressure | Bulk density ($g/cm^3$) |
|---|---|---|---|---|---|

| | | | | | |
|---|---|---|---|---|---|
| 6 | 133 | 9.7 | 93.2 | 3160 | 0.332 |
| 7 | 107 | 3.8 | 95.9 | 2060 | 0.329 |
| 8 | 97 | 7.3 | 92.3 | 3040 | 0.279 |
| 9 | 123 | 11.0 | 90.7 | 3420 | 0.317 |
| 10 | 73 | 2.3 | 96.4 | 1300 | 0.301 |
| 11 | 83 | 4.1 | 94.5 | 760 | 0.291 |
| 12 | 90 | 4.4 | 95.3 | 1730 | 0.302 |
| 13 | 99 | 3.8 | 95.6 | 1830 | 0.324 |
| 14 | 120 | 11.7 | 94.8 | 2500 | 0.322 |
| 15 | 112 | 9.3 | 95.1 | 2240 | 0.331 |

COMPARATIVE EXAMPLE 1

A solid catalyst was prepared in the same manner as in part (III), Example 1, using magnesium chloride instead of the solid material prepared in Example 1 by reacting an organomagnesium complex with a chlorosilane compound. The solid catalyst was synthesized by reacting 2.0 g of anhydrous $MgCl_2$ with 30 ml of titanium tetrachloride at 130° C. for 2 hours, filtering, washing and drying the solid portion, then reacting with benzoic acid for one hour. The solid catalyst contained 0.07 wt.% of titanium. Polymerization was carried out in hexane as a solvent in the same manner as in part (IV), Example 1, using 1.0 g of the solid catalyst, 3.2 mmol of triethylaluminum, and 1.2 mmol of ethyl benzoate. There were obtained 38 g of a hexane-insoluble polymer and 12 g of a hexane-soluble matter. After the hexane-insoluble polymer was extracted with boiling n-heptane, the remaining portion was 76.5%. The catalyst efficiency was 4 g of polymer/g of solid catalyst·hour propylene pressure or 5,420 g of polymer/g of Ti hour·propylene pressure.

COMPARATIVE EXAMPLE 2

In the reaction of an organomagnesium complex with chlorosilane described in part (II), Example 1, there was used methyl trichlorosilicon, $SiCl_3CH_3$, instead of $HSiCl_3$ to carry out a same reaction. To a 500-ml flask equipped with a dropping funnel and a water-cooled reflux condenser, there was charged under nitrogen atmosphere 100 mmol of methyltrichlorosilicon $SiCl_3CH_3$ in heptane (1 mol/l). The flask was heated to 50° C. Thereafter, 100 mmol of an organomagnesium complex solution synthesized as in part (I) of Example 1 was weighed and taken up in the dropping funnel, and added to the flask dropwise with stirring at 50° C. over one hour. The mixture was further reacted for one hour at this temperature to form a white precipitate. The precipitate was isolated, washed with hexane and dried to obtain 0.42 g of a white solid material. Yield of the solid material was 1/20 times as small as in part (II).

EXAMPLE 16

(i) Synthesis of solid catalyst component

The oxygen and moisture in the inside of a 500 ml flask equipped with a dropping funnel and a water-cooled reflux cooler were removed by nitrogen flushing, a 2 mol/l hexane solution of monomethyldichlorosilane ($HSiCl_2CH_3$) (200 mmol) was charged therein under the nitrogen atmosphere and the temperature was elevated up to 65° C. The organomagnesium complex solution (100 mmol) synthesized according to the method same with that of example 1, (i) was taken up into the dropping funnel and dropped into the flask at 65° C., with stirring over one hour and the reaction continued at this temperature for another one hour. After the resulting hydrocarbon-insoluble white precipitate was isolated, washed with hexane and dried, 8.5 g of white solid material was obtained. The result of analysis of this solid material showed that it contained 9.25 mmol of Mg, 17.9 mmol of Cl, 1.64 mmol of Si and 0.53 mmol of alkyl group and had a specific surface area of 281 $m^2/g$ as measured according to B.E.T. method.

In a pressure-proof vessel having been purged with nitrogen, 5.0 g of the above-mentioned solid, a hexane solution of 0.1 mol/l ethyl benzoate (6.0 mmol) was charged therein and after reaction was carried out at 80° C. with stirring for one hour, the solid portion was filtered, isolated, washed sufficiently with hexane and dried to give white solid. Into a pressure-proof vessel having been purged with nitrogen 4.5 g of solid, and 60 ml of titanium tetrachloride were fed and after reaction was carried out with stirring at 100° C. for 2 hours, the solid portion was filtered, isolated, sufficiently washed with hexane and dried to obtain pale yellow solid catalyst component. The result of analysis of this solid showed that it contained 2.50% by weight of titanium per 1 g of solid.

(ii) Propylene polymerization in a solvent

By using 50 mg of the solid catalyst, 3.2 mmol of triethylaluminum and 1.2 mmol of ethyl benzoate, polymerization was carried out in a hexane solvent as in example 1 whereby 107 g of hexane-insoluble polymer and 3.7 g of hexane soluble portion were obtained. The catalyst efficiency was 214 g. polymer/g·solid catalyst·hour·propylene pressure i.e. 8560 g polymer/g titanium·hr·propylene pressure. The remaining part of hexane-insoluble polymer after extraction with boiling n-heptane was 96.1%. The hexane insoluble polymer had an intrinsic viscosity of 5.1 dl/g and the bulk density of polymer was 0.335 $g/cm^3$.

(iii) Propylene polymerization in liquid propylene

Liquid propylene (350 g) was introduced in a 1.5 l autoclave after flushing the inside with nitrogen and evacuating to vacuum and heated up to the inside temperature of 60° C. The solid catalyst (20 mg) synthesized in (i), 1.6 mmol of triethylaluminum and 0.6 mmol of ethyl benzoate were added to the autoclave. Polymerization was carried out while maintaining the inside pressure at 60° C. for 2 hours to obtain 130 g polymer. Polymerization yield was 3250 g polymer/g solid catalyst·hr; 130,000 g polymer/g titanium·hr. The remaining portion after extraction of polymer with boiling heptane was 92.9%.

EXAMPLE 17

A hexane solution of triethylaluminum (50 ml, 1 mol/l) and a hexane solution of ethyl benzoate (25 ml.1 mol/l) were reacted in advance. By using 1.6 ml of the reacted solution and 50 mg of the solid catalyst synthesized in example 16 and 0.8 mmol of triethylaluminum, polymerization was carried out as in Example 1, (IV), in a hexane solvent at an inside temperature of 60° C. under the total pressure of 4.8 Kg/cm² (gauge pressure) to obtain 148 g of hexane insoluble polymer, and 4.8 g of hexane soluble portion. The remaining portion after extracting the hexane insoluble polymer with boiling n-heptane was 95.0%. Polymerization yield was 296 g polymer/g solid catalyst·hr·propylene pressure, 11,800 g polymer/g titanium·hr·propylene pressure.

EXAMPLES 18-27

A solid catalyst component was synthesized by carrying out the reaction as in example 16 except that a solid material was synthesized by using the organomagnesium complex of example 16 and trichlorosilane (HSiCl₃) in place of monomethyldichlorosilane (HSiCl₂CH₃), carboxylic acid and its derivatives shown in Table 2 in place of reacting the solid material of example 16 with ethyl benzoate. By using 50 mg of this solid catalyst component and, as a liquid catalyst component, products obtained by reacting 3.2 mmol of triethylaluminum and 1.2 mmol of the carboxylic acids or derivatives thereof shown in Table 2 or 0.8 mmol of triethyl aluminum and a product obtained by reacting in advance 1.6 mmol of triethylaluminum and 0.8 mmol of the carboxylic acids or derivatives thereof, polymerization was carried out as example 1, (iv), in a hexane solvent at the inside pressure of 60° C. under the total pressure of 4.8 Kg/cm² (gauge pressure) for 2 hours to obtain the polymerization result shown in Table 2.

tives thereof (1.2 mmol) shown in Table 3 were used to carry out polymerization as in example 1, (iv) in hexane solvent at an inside temperature of 60° C. under 4.8 Kg/cm² (gauge pressure) of total pressure to obtain polymerization results of Table 3.

Table 3

| | | Polymerization results | | | |
|---|---|---|---|---|---|
| Examples | Carboxylic acids and derivatives thereof | Polymer yield (g) | Hexane soluble portion (g) | Remaining portion after extraction with n-heptane | polymer/g titanium·hr·propylene pressure |
| 28 | Toluic acid | 112 | 8.6 | 90.2 | 10,200 |
| 29 | Benzoyl chloride | 86 | 3.3 | 93.1 | 7,820 |
| 30 | Toluyl chloride | 93 | 4.4 | 92.8 | 8,450 |
| 31 | Benzoic anhydride | 98 | 6.7 | 90.9 | 8,910 |
| 32 | Ethyl n-heptanoate | 101 | 5.7 | 91.9 | 9,180 |
| 33 | Methyl maleate | 92 | 4.9 | 91.6 | 8,360 |
| 34 | Methyl methacrylate | 90 | 4.4 | 93.2 | 8,180 |
| 35 | Methyl benzoate | 87 | 3.7 | 95.6 | 7,910 |
| 36 | Isopropyl benzoate | 91 | 4.7 | 93.7 | 8,270 |
| 37 | n-butyl benzoate | 97 | 5.4 | 92.8 | 8,820 |
| 38 | Methyl p-toluic acid | 86 | 2.9 | 94.8 | 7,820 |

Table 2

| | Solid catalyst component | | | Liquid catalyst component | | Polymerization results | | | |
|---|---|---|---|---|---|---|---|---|---|
| Examples | Carboxylic acids and derivatives thereof | Amount of titanium (% by wt) | Used solid catalyst (mg) | Organo-aluminum component | Carboxylic acids and derivatives thereof or reaction products with organo-aluminum | Polymer yield (g) | Hexane soluble portion (g) | Remaining portion after extraction with n-heptane | g-polymer/g titanium·hr·propylene pressure |
| 18 | Benzoic acid | 2.30 | 50 | AlEt₃ | Benzoic acid | 118 | 9.0 | 88.6 | 10,300 |
| 19 | Benzoic acid | 2.30 | 50 | AlEt₃ | Reaction product of AlEt₃ and benzoic anhydride | 146 | 11.4 | 87.7 | 12,700 |
| 20 | Benzoyl chloride | 2.20 | 50 | AlEt₃ | Benzoyl chloride | 116 | 5.0 | 94.9 | 10,500 |
| 21 | Benzoyl chloride | 2.20 | 50 | AlEt₃ | Reaction product of AlEt₃ and benzoyl chloride | 142 | 6.2 | 93.6 | 12,900 |
| 22 | Benzoic anhydride | 2.30 | 50 | AlEt₃ | Benzoic anhydride | 101 | 6.4 | 90.1 | 8,780 |
| 23 | Benzoic anhydride | 2.30 | 50 | AlEt₃ | Reaction product of AlEt₃ and benzoic anhydride | 132 | 8.5 | 89.3 | 11,500 |
| 24 | Methyl p-toluate | 2.10 | 50 | AlEt₃ | Methyl p-toluate | 90 | 4.2 | 94.7 | 8,570 |
| 25 | Methyl p-toluate | 2.10 | 50 | AlEt₃ | Reaction product of AlEt₃ and benzoic anhydride | 125 | 5.8 | 93.9 | 11,900 |
| 26 | Methyl methacrylate | 2.40 | 50 | AlEt₃ | Methyl methacrylate | 91 | 4.1 | 94.3 | 7,580 |
| 27 | Methyl methacrylate | 2.40 | 50 | AlEt₃ | Reaction product of AlEt₃ and benzoic anhydride | 129 | 5.6 | 93.4 | 10,800 |

EXAMPLES 28-41

In the reaction of the solid material and ethyl benzoate in example 16, ethyl anisate was used and by processing as in example 16 in other points, solid catalyst component was synthesized. The result of analysis of this solid showed that it contained 2.20% by weight of titanium. This catalyst component (50 mg) and triethylaluminum (3.2 mmol) and carboxylic acids and deriva-

| 39 | Ethyl p-toluic acid | 90 | 3.8 | 95.4 | 8,180 |
| 40 | Methyl anisate | 86 | 5.5 | 94.6 | 7,820 |
| 41 | Methyl terephthalate | 94 | 4.6 | 92.4 | 8,550 |

EXAMPLES 42-44

The solid catalyst component (50 mg) synthesized according to the process of example 16, ethyl p-toluate (1.2 mmol) and organometallic compounds shown in Table 4 (3.2 mmol) were used in the polymerization carried out in a solvent of hexane as in example 1 (iv) at the inside temperature of 60° C. under 4.8 Kg/cm² (gauge pressure) of the total pressure for 2 hours to obtain the polymerization results shown in Table 4.

Table 4

| | | Polymerization results | | | |
|---|---|---|---|---|---|
| Examples | Organometal compound | Polymer yield (g) | Hexane-soluble portion (g) | Remaining portion after extraction with n-heptane (%) | Catalyst yield (g-polymer/ g-Ti hour-propylene pressure) |
| 42 | Diethylaluminum hydride | 101 | 4.8 | 94.5 | 8,080 |
| 43 | Tri-isobutyl aluminum | 129 | 7.9 | 90.7 | 10,300 |
| 44 | AlMg$_6$(C$_2$H$_5$)$_{2.9}$-(n-C$_4$H$_9$)$_{12.1}$ | 76 | 3.6 | 93.7 | 7,680 |

EXAMPLE 45

Polymerization of butene-1 was carried out in hexane in the same manner as in Example 1 (IV), using 400 mg of the solid catalyst component synthesized in Example 1 (III) and 6.0 mmol of triethylaluminum and 2.0 mmol of ethyl benzoate. There was obtained 34.8 g of a white polymer.

EXAMPLE 46

Polymerization of 4-methylpentene-1 was carried out in hexane in the same manner as in Example 1 (iii), using 400 mg of the solid catalyst prepared in Example 1 (III) and 6.0 mmol of triethylaluminum and 2.0 mmol of ethyl benzoate. There was obtained 29.1 g of a white polymer.

What is claimed is:

1. In a catalyst useful for polymerizing olefins comprising a magnesium compound, a titanium compound, an electron donor, and an organometallic compound, the improvement which is characterized in that a solid (1) is obtained by reacting one mole of organomagnesium component (i) represented by the general formula $$M_\alpha Mg_\beta R_p^1 R_q^2 X_r Y_s$$

wherein
- $\alpha$ is a number of 0 or greater than 0;
- $\beta > 0$;
- p, q, r and s are each numbers 0 or greater than 0, respectively, having the relationship of $p+q+r+s = m\alpha + 2\beta$;
- M is a metal component of the 1st to the 3rd group of the Periodic Table;
- m is the valency of M;
- $R^1$ and $R^2$ are the same or different hydrocarbon groups having 1-20 carbon atoms;
- X and Y are the same or different groups selected from the group consisting of halogen, $OR^3$, $OSiR^4R^5R^6$, $NR^7R^8$ and $SR^9$, wherein
$R^3$, $R^4$, $R^5$, $R^6$, $R^7$ and $R^8$ are hydrogen atoms or hydrocarbon groups having 1-20 carbon atoms, and $R^9$ is a hydrocarbon group having 1-20 carbon atoms, with 0.01-100 moles of chlorosilane compound (ii) containing Si—H bonds and represented by the general formula $$H_a SiCl_b R_{4-(a+b)}$$

wherein
- $0 < a \leq 2$,
- b is a number greater than 0,
- $a+b \leq 4$, and
- R is a hydrocarbon group having 1-20 carbon atoms, that a solid catalyst component (A) is obtained by reacting said solid (1), a titanium compound (2) selected from a tetravalent titanium halide and/or a trivalent titanium halide, and a carboxylic acid or a derivative thereof (3) selected from a carboxylic acid having up to 30 carbon atoms, an acid halide having up to 30 carbon atoms, an acid anhydride or a carboxylic acid ester having up to 30 carbon atoms in the carboxylic portion, and that said catalyst component (A) is used with a component (B) comprising an organometallic compound of a metal selected from Groups I, II, III of the Periodic Table mixed with a carboxylic acid or derivative thereof selected from a carboxylic acid having up to 30 carbon atoms, an acid halide having up to 30 carbon atoms, an acid anhydride or a carboxylic acid ester having up to 30 carbon atoms in the carboxylic portion.

2. A catalyst for polymerizing olefins according to claim 1, wherein said organomagnesium component (i) is a hydrocarbon-soluble organomagnesium complex compound,
wherein
- $\alpha$ is a number greater than 0,
- M is an atom selected from the group consisting of aluminum, boron, zinc and beryllium, and
- X and Y are groups other than halogen, respectively.

3. A catalyst for polymerizing olefins according to claim 1, wherein said organomagnesium component (i) is a hydrocarbon soluble organomagnesium compound, wherein
- $\alpha$ is 0, and
- X and Y are groups other than halogen, respectively.

4. A catalyst for polymerizing olefins according to claim 2, wherein the ratio of $\beta/\alpha$ is in the range of 0.5-10.

5. A catalyst for polymerizing olefins according to claim 2, wherein the ratio of $(r+s)/(\alpha+\beta)$ is in the range of 0–0.8.

6. A catalyst for polymerizing olefins according to claim 1, wherein said titanium compound (A) (2) is a titanium tetrachloride.

7. A catalyst for polymerizing olefins according to claim 1, wherein said titanium compound (A) (2) is titanium trichloride.

8. A catalyst for polymerizing olefins according to claim 1, wherein said titanium compound (A) (2) is a tetravalent titanium halide or a trivalent titanium halide.

9. A catalyst for polymerizing olefins according to claim 1, wherein said titanium compound (A) (2) is titanium tetrachloride or titanium trichloride.

10. A catalyst for polymerizing olefins according to claim 1, wherein said carboxylic acid or derivative thereof (A) (3) is used in 0.001–50 times the molar amount of the hydrocarbon groups included in the solid obtained by reacting the organo-magnesium component and chlorosilane compound containing Si—H bonds.

11. A catalyst for polymerizing olefins according to claim 1, wherein said organometallic compound (B) is a hydrocarbon soluble organomagnesium complex compound having the general formula $$M_\alpha Mg_\beta R^1_p R^2_q X_r Y_s$$

wherein
$\alpha$ and $\beta$ are numbers greater than 0,
$\beta/\alpha$ is in the range of 0.1–10,
p, q, r and s are 0 or a number greater than 0, respectively, having the relationships $p+q+r+s=m\alpha+2\beta$ and $0\leq(r+s)/(\alpha+\beta)<1.0$
wherein
M is an atom selected from the group consisting of aluminum, zinc, boron and beryllium,
m is the valency of M,
$R^1$ and $R^2$ the same or different hydrocarbon groups having 1–20 carbon atoms,
X and Y are the same or different groups selected from the group consisting of $OR^3$, $OSiR^4R^5R^6$, $NR^7R^8$ and $SR^9$
wherein
$R^3$, $R^4$, $R^5$, $R^6$, $R^7$ and $R^8$ are hydrogen atoms or a hydrocarbon group having 1–20 carbon atoms, and
$R^9$ is a hydrocarbon group having 1–20 carbon atoms.

12. A catalyst for polymerizing olefins according to claim 11, wherein M of said organomagnesium complex compound is an aluminum atom.

13. A polymerization catalyst according to claim 1, wherein said organometallic compound (B) is an organoaluminum compound having the general formula $$AlR^{10}_t Z_{3-t}$$

wherein
$R^{10}$ is a hydrocarbon group having 1–20 carbon atoms,
Z is a member selected from the group consisting of hydrogen, halogen, alkoxy, aryloxy and a siloxy group, and
t is from 2–3.

14. A polymerization catalyst according to claim 13, wherein said organoaluminum compound is a trialkylaluminum or a dialkylaluminum hydride.

15. A polymerization catalyst according to claim 1, wherein said component (B) consisting of an organoaluminum compound and a carboxylic acid or its derivative is used by adding separately the product obtained by first reacting one part of an organoaluminum component having the general formula $$AlR^{10}_t Z_{3-t}$$

wherein
$R^{10}$ is a hydrocarbon group having 1–20 carbon atoms,
Z is a member selected from the group consisting of hydrogen, halogen, alkoxy, aryloxy and siloxy group,
with a carboxylic acid or its derivative, and then adding the remaining organoaluminum compound.

* * * * *